United States Patent
Walter

(10) Patent No.: US 11,671,646 B2
(45) Date of Patent: Jun. 6, 2023

(54) ONE TOUCH VIDEO DEVICE

(71) Applicant: DESIGNPOINT INDUSTRIAL DESIGN STUDIO, INC., Cape Neddick, ME (US)

(72) Inventor: Glen V. Walter, Lowell, MA (US)

(73) Assignee: DESIGNPOINT INDUSTRIAL DESIGN STUDIO, INC., Cape Neddick, ME (US)

( * ) Notice: Subject to any disclaimer, the term of this patent is extended or adjusted under 35 U.S.C. 154(b) by 0 days.

(21) Appl. No.: 17/659,087

(22) Filed: Apr. 13, 2022

(65) Prior Publication Data

US 2022/0385964 A1    Dec. 1, 2022

Related U.S. Application Data

(60) Provisional application No. 63/174,135, filed on Apr. 13, 2021.

(51) Int. Cl.
    *H04N 21/41*    (2011.01)
    *H04N 21/485*    (2011.01)

(52) U.S. Cl.
    CPC ..... *H04N 21/4126* (2013.01); *H04N 21/4122* (2013.01); *H04N 21/485* (2013.01)

(58) Field of Classification Search
    None
    See application file for complete search history.

(56) References Cited

U.S. PATENT DOCUMENTS

2021/0329424 A1*  10/2021  Barzuza ............ H04M 1/72451
2022/0247919 A1*   8/2022  O'Leary ............ G06F 3/04883

* cited by examiner

*Primary Examiner* — Samira Monshi
(74) *Attorney, Agent, or Firm* — Lando & Anastasi, LLP

(57) ABSTRACT

A video device includes a base unit; a network interface; a handheld receiver communicatively coupled to the base unit; a graphical user interface (GUI) positioned on the base unit, the GUI being configured to sense a touch of a user; and at least one processor housed in the base unit, the at least one processor configured to initiate, over the network interface, a call with at least one other participant responsive to a single touch by the user on a region of the GUI; display, on the GUI, at least one first video stream from the at least one other participant; and stream, to the handheld receiver, an audio component of the at least one first video stream from the at least one other participant.

16 Claims, 6 Drawing Sheets

ONE TOUCH VIDEO DEVICE

CROSS-REFERENCE TO RELATED APPLICATIONS

This application claims priority under 35 U.S.C. § 119(e) to U.S. Provisional Application Ser. No. 63/174,135, titled "ONE TOUCH VIDEO DEVICE," filed on Apr. 13, 2021, which is hereby incorporated herein by reference in its entirety.

BACKGROUND OF DISCLOSURE

The present disclosure relates generally to teleconference/videoconference devices. Prior art devices typically come from one of two varieties. In one example, a typical prior art device includes a receiver and a base unit, but incorporates a user interface that require a user to navigate a dialing pad or a confusing and limited display interface. In another example, a device may include smart devices, such as virtual assistants, through which a user can engage in video or audio calls with others, but without the benefit of a separate (e.g., handheld) receiver; such a device may also require third-party applications.

SUMMARY OF DISCLOSURE

One aspect of the disclosure is directed to a video device comprising a base unit and a receiver. The base unit includes a display and one or more buttons allowing a user to interact with the device. The user can make video or audio calls with a single touch by using an intuitive, customizable interface on the display. Once the call has been initiated, the user may speak into a microphone on the receiver to be heard by the other participants, and may receive audio from the other participants through a speaker in the receiver.

In some embodiments, the display may be customizable by an administrator of the video device, who may be located remotely from the device but may interact with the video device over the Internet, such as by using a mobile app installed on the administrator's mobile device. For example, the administrator may be able to configure the display to show "favorites" icons or images for select contacts the user is anticipated to call. The administrator may also be able to remotely change other functionality of the video device, such as default behavior when the receiver is placed on, or removed from, a cradle on the base unit, or the ability to contact others beyond the defined "favorites."

This arrangement may be beneficial in situations where a user is a professional expected to participate in teleconferences while simultaneously needing access to their computer. An employer of the professional may configure the favorite contacts and settings and other defaults for the device. In another example, the arrangement may be beneficial in situations where the user has cognitive and/or memory issues, such as an elderly person suffering from Alzheimer's Disease or other disorder causing memory loss or dementia. In that situation, the administrator may be a caregiver (e.g., adult child) of the user, and may wish to make it easy to configure (and re-configure) the video device for use by user (their parent) to facilitate calling family members or other known contacts through the use of a one-touch interface, while restricting the user's ability to freely make phone calls to others. The arrangement may be beneficial in any situation where privacy/discretion is necessary during the course of a video or audio call.

In some embodiments, the video device may be configured to execute one or more applications to stream audio-visual entertainment sources.

According to one aspect, a video device includes a base unit; a network interface; a handheld receiver communicatively coupled to the base unit; a graphical user interface (GUI) positioned on the base unit, the GUI being configured to sense a touch of a user; and at least one processor housed in the base unit, the at least one processor configured to initiate, over the network interface, a call with at least one other participant responsive to a single touch by the user on a region of the GUI; display, on the GUI, at least one first video stream from the at least one other participant; and stream, to the handheld receiver, an audio component of the at least one first video stream from the at least one other participant.

According to one embodiment, the at least one processor is further configured to receive, over the network interface, an instruction to change at least one operating parameter of the video device. According to a further embodiment, the instruction is received from an administrator of the video device. According to yet a further embodiment, the at least one operating parameter is at least one of a speed-dial contact, an image of a contact, contact information for the contact, an operational mode of the video device, and a default operation of at least one video camera or at least one microphone of the video device.

According to another embodiment, the video device further comprises at least one video camera, wherein the processor is configured to transmit, over the network interface, at least one second video stream to the at least one other participant.

According to one embodiment, the at least one processor is further configured to modify the at least one first video stream on the display. According to a further embodiment, the modification comprises at least one of a cropping and a zooming of the at least one first video stream.

According to another embodiment, the handheld receiver further comprises a second display configured to display the at least one first video stream from the at least one other participant.

According to still another embodiment, the base unit further comprises a sensor configured to detect a presence of the handheld receiver on a cradle of the base unit, and wherein the at least one processor is further configured to responsive to detecting a presence of the handheld receiver on the cradle of the base unit, switching to a changed mode of operation of the video device.

In some embodiments, the video device may be configured to receive a voice command from a user and execute an operation in response, such as dialing a contact.

In some embodiments, the video device may comprise a button to enable and/or disable an audio and/or video stream from a camera and/or a microphone of the video device.

In some embodiments, the video device may be selectively operable in one of a plurality of operation modes. In some examples, the operation mode may be selected based upon a presence of a mobile device associated with a user or administrator of the device, in response to a voice command received by the video device, a time of day, or a location of the video device.

In some embodiments, the video device may attempt to dial a contact by a second method after failing to reach the contact by a first method.

In some embodiments, the video device may incorporate a smart camera module configured to pan and zoom automatically based on a location of the user within a video frame.

In some embodiments, the video device may adjust the display based on an environment in which the user is located, such as a light level or time of day.

In some embodiments, the receiver may incorporate a second display, and may incorporate one or more input elements by which the user can interact with the video device.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
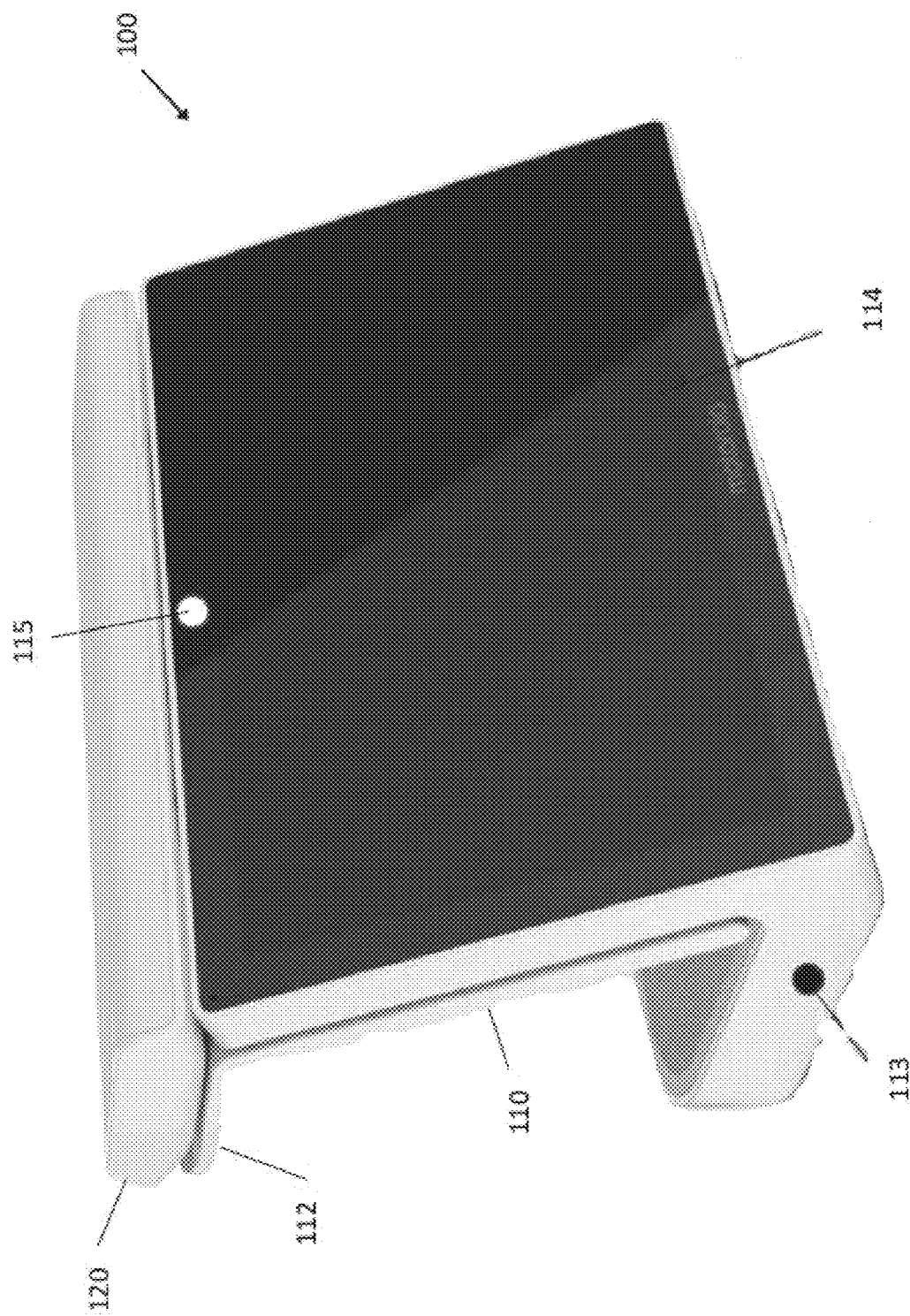
FIG. 1A is a front perspective view of an embodiment of a video device.

This disclosure is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The present disclosure relates to a video device comprising a base unit and a receiver, the base unit comprising a display and one or more buttons allowing a user to interact with the device. The user can make video or audio calls by interacting with images or other icons on the display. Once the call has been initiated, the user may speak into a microphone on the receiver to be heard by the other participants, and may receive audio from the other participants through a speaker in the receiver.

For purposes of illustration, and with reference to FIGS. 1A, 1B, and 1C, embodiments of the present disclosure will now be described with reference to a video device, generally indicated at 100. The video device 100 includes a base unit 110 and a receiver 120. The base unit 110 is configured to removably retain the receiver 120, such as on a cradle 112. The receiver 120 may be stored on the cradle 112 when the video device 100 is not in use, or when the video device 100 is in use and the receiver 120 is not being used. The cradle 112 may incorporate one or more sensors 122 (e.g., switches) to detect when the receiver 120 is present in the cradle 112 and when it is not.

The base unit 110 includes a processor 111 and a display 114 through which the user can interact with the video device 100 by touching regions of the display 114, as will be described in more detail below. For example, the display 114 may allow a user to call one or more contacts; change settings for the video device 100; end a call; invite others to join a call; and the like. The display 114 may also display a video stream of one or more other participants on a video call, and may also display a picture or icon of one or more participants on an audio-only call, or participants who do not have a video camera enabled during a call. The display 114 may be configured to save power by shutting down or going into a sleep mode after a period of inactivity by the user, but may be configured to re-activate upon detection of an incoming call or other event.

The base unit 110 includes at least one video camera 115, allowing the video device 100 to transmit video of the user to other participants on a video call. The base unit 110 and/or the receiver 120 may also each incorporate one or more microphones 113, such as a 360-degree microphone, and in some embodiments may perform noise cancellation on audio signals received through the one or more microphones. In some examples, a plurality of microphones may be arranged in a microphone array, and may be configured to perform beamforming or other techniques. The one or more microphones may allow the user to give voice commands to the video device 100. Such voice commands could cause the video device 100 to call one or more contacts, increase or decrease the volume, turn the user's camera on or off, switch to a different operating mode (e.g., do not disturb), or power off the device.

The base unit 110 and/or the receiver 120 may also each incorporate one or more speakers 130 such as rear-porting transducers. The speakers may play audio from the call for the user, and may also be used to audibly confirm an operation (e.g., "Calling Mike").

The display 114 and the base unit 110 generally may be configured to orient the display 114 such that it is visible to a user sitting in front of the base unit 114. In some embodiments, the base unit 110 may be configured to tilt the display 114; in other embodiments the base unit 110 may hold the display 114 at a fixed angle.

Figure 1B:
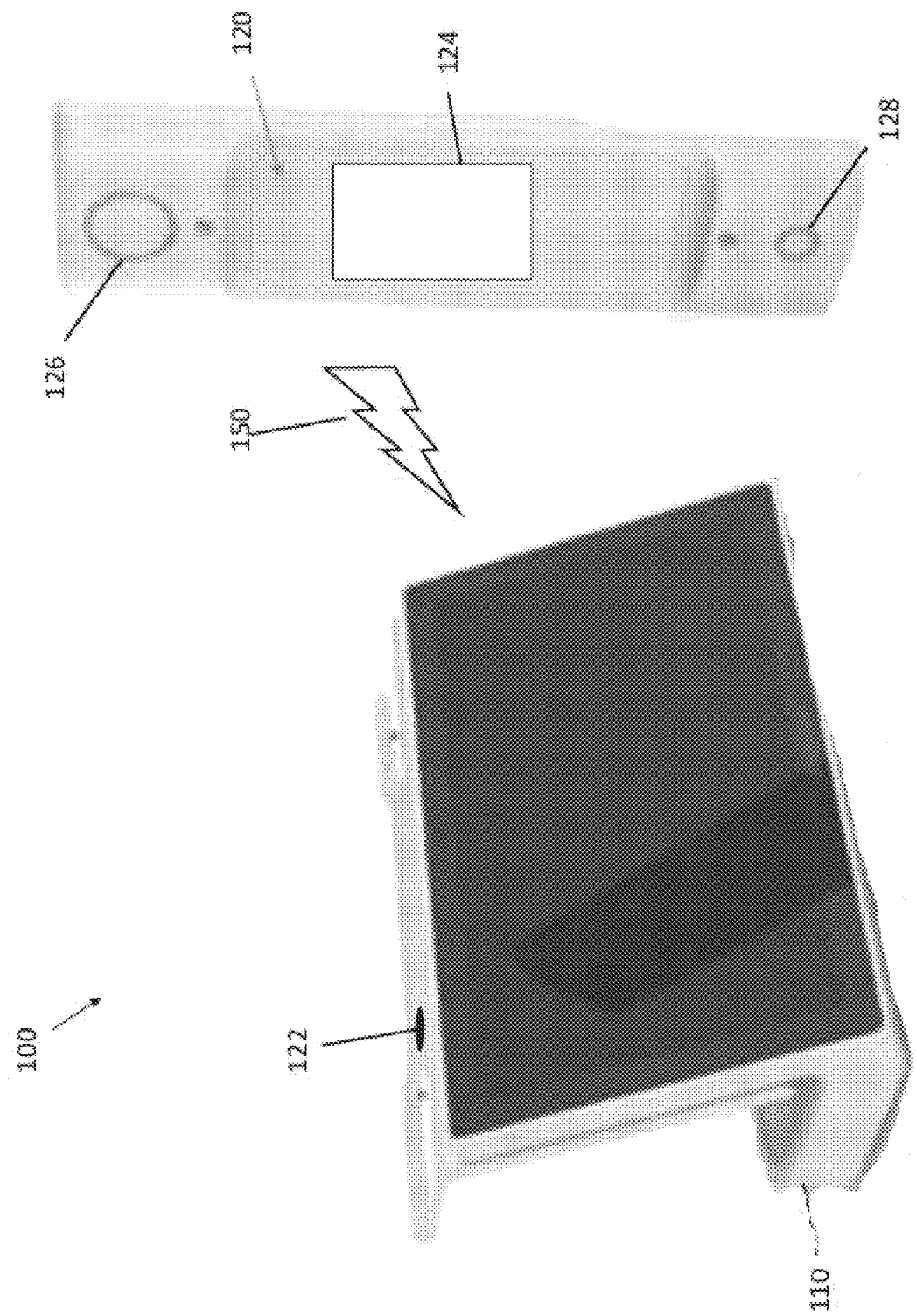
FIG. 1B is a block diagram of an embodiment of a base unit and a receiver of a video device.

With reference to FIG. 1B, the receiver 120 is removed from the base unit 110. The receiver 120 may incorporate one or more interface elements (e.g., buttons), and may be intentionally designed to provide limited functionality through the receiver 120. For example, the receiver 120 may include a power button configured to turn on or off the video device 100 and/or the receiver 120. The receiver 120 may also include a mute button (not shown) configured to disable a microphone 128 in the receiver 120. The receiver 120 may also include a speaker button configured to turn on a speaker 126 in the receiver 120. The speaker 126 allows the receiver 120 to function as a traditional phone earpiece, which may be advantageous for users with hearing impairments or located in noisy situations, or where privacy or discretion is desired.

In some embodiments, the receiver 120 may incorporate a second display 124 that may display a video stream of one or more other participants on the call. In other embodiments, the receiver 120 may include a keyboard and/or dialing pad to allow the user to dial additional participants. The receiver may also operate as a "remote control" for the base unit 110, allowing the user to interact with user interface elements on the display 114. It will be appreciated that different variations of the receiver 120 are possible. In one example, the receiver 120 may include only a small number (e.g., one to three) of buttons or other interface elements for interacting with the base unit 110. In another example, the receiver 120 may include those buttons as well as the second display 124. In another example, the receiver 120 may include just a keyboard and/or a dialing pad. In another example, the receiver 120 may include both the keyboard/dialing pad and the second display 124. In yet another example, the receiver 120 may include on the second display 124.

The receiver 120 and the base unit 110 may be configured to communicate with one another over a wireless connection 150, such as a Bluetooth connection or WIFI network.

Figure 1C:
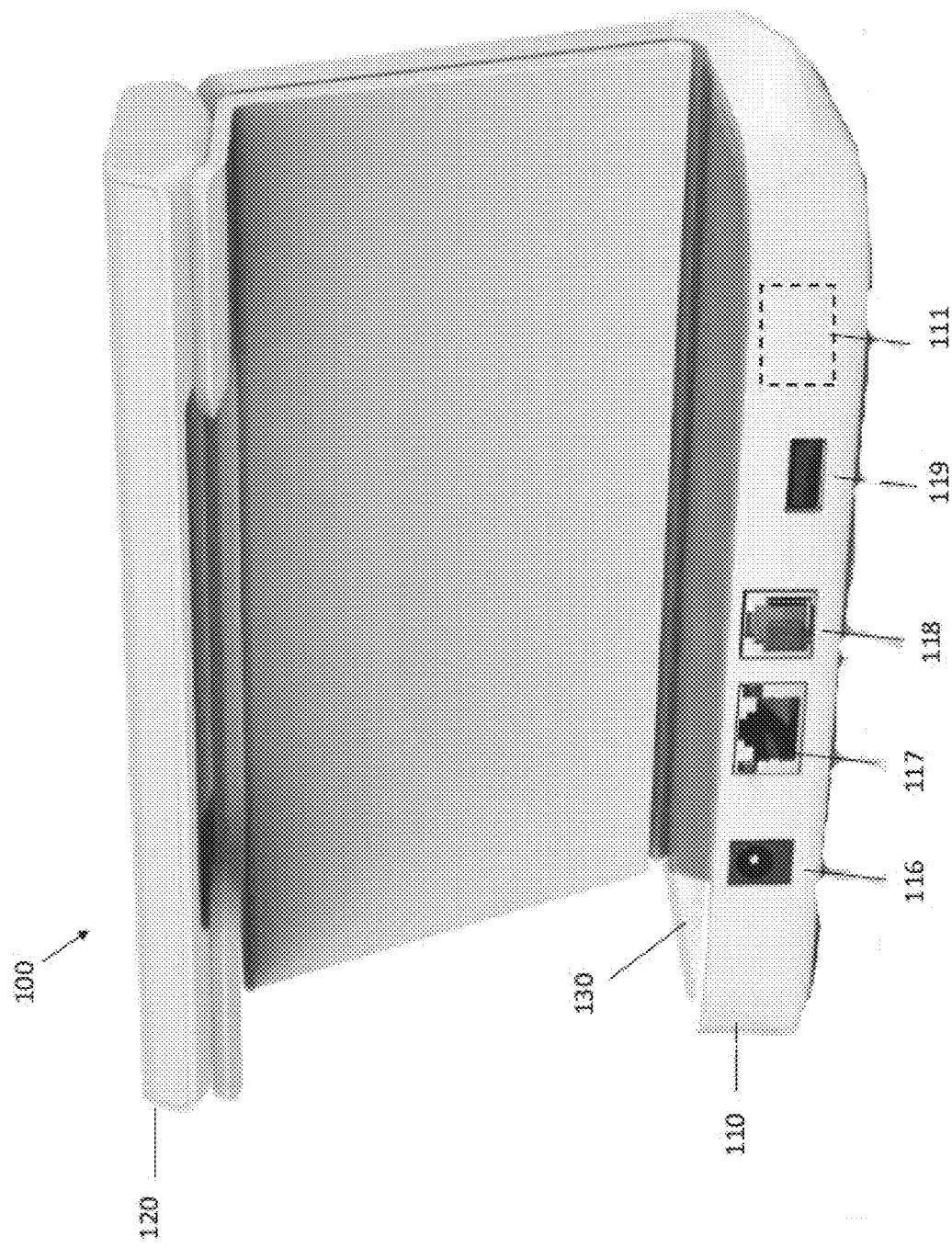
FIG. 1C is a rear perspective view of an embodiment of a video device.

With reference to FIG. 1C, the base unit 110 may incorporate one or more inputs for connecting the base unit 110 to a power source and/or one or more communication networks. For example, the base unit 110 may include a power jack 116, an Ethernet jack 117, a telephone jack 118, and/or a USB port 119 (e.g., USB-A or USB-C). In some embodiments, the base unit 110 may need to be connected to a power source during operation. In other embodiments, the base unit 110 may incorporate a rechargeable battery (not shown) allowing it to be disconnected from the power source during operation. In some embodiments, the video device 100 may be configured to connect to the Internet via a WIFI network as an alternative to a hard-wired connection through the Ethernet jack 117, for example.

Figure 2:
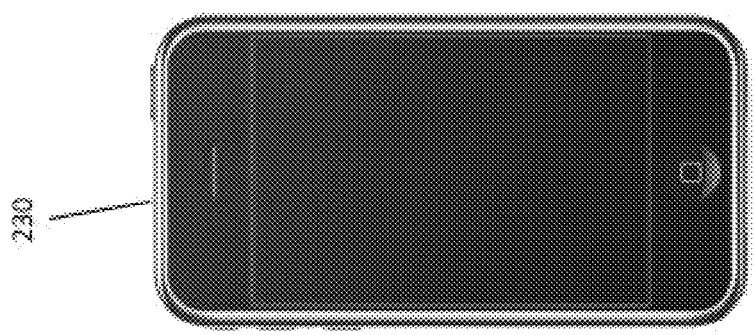
FIG. 2 is a block diagram of a video device and a mobile device according to an embodiment.
Figure 2:
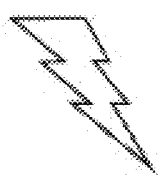
Figure 2:
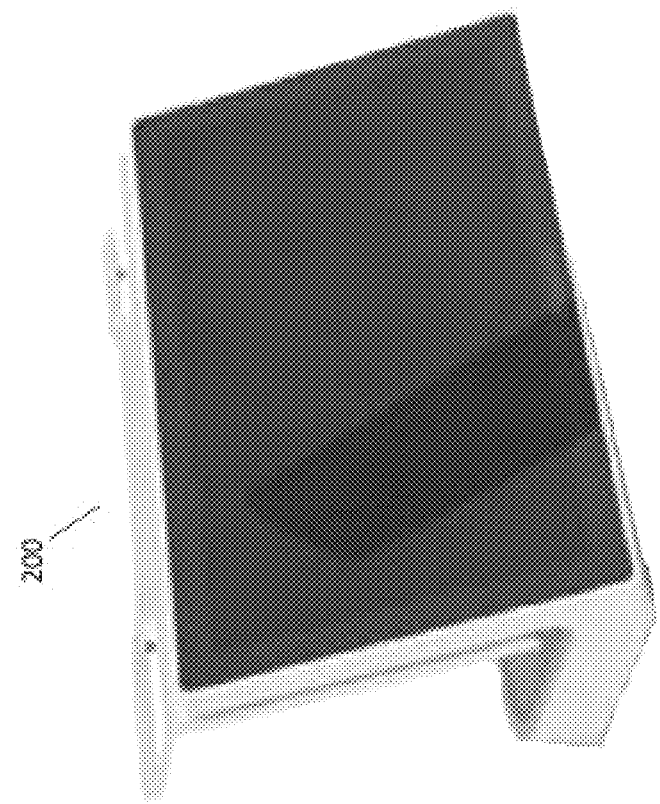

With reference to FIG. 2, in some embodiments a mobile device 230 can be configured to change one or more presets or other settings on a video device 200. For example, a mobile app installed on the mobile device 230 (e.g., a mobile phone of the user or another person) may be used to set "favorite" contacts of the user. In addition to individual contacts, the mobile app may allow for group contacts to be defined. For example, a group contact could be created that allows the user to initiate a group video call with all of the user's children.

The mobile device 230 may be associated with the user, or with an administrator of the video device 200. In one example, the administrator may be a relative or other caretaker of the user, and the mobile device 230 may be the administrator's smart phone.

In addition to identifying favorite contacts, the mobile device 230 may be used to set a nickname for each individual or group contact (e.g., "David," or "Kids"); upload or otherwise choose an image to represent the contact on the display 114; and order or otherwise arrange the contacts in a desired order or arrangement on the display 114. One or more contact methods may be provided for each contact, and the methods may be arranged in a preferential order. For example, a particular favorite contact may be configured so that a call to the contact goes first to the contact's mobile device; if the call cannot be completed, a call may then be attempted to the contact's home phone number, then work number, and so forth. The mobile device 230 may also be configured to receive alerts when certain events occur, such as the video device 200 being used to make a call to particular contacts or unknown contacts; the video device 200 being turned on or off; or a particular voice command being given to the video device 200 by the user.

The video device 100 or 200 and/or the display 114 may allow for a number of customizations/configurations, either through the display 114 or the mobile device 230 or otherwise. For example, the video device 100 may be configured to set default modes of operation in response to certain conditions. "Downtime" hours may be set during which the video device 100 is not allowed to receive (or make) calls. In another example, the video device 100 may be configured to automatically enable or disable the user's camera and/or microphone, or end a call altogether, in response to the user removing or replacing the receiver 120 in the cradle 112, or may switch between a microphone (or microphone array) on the base unit 100 and a microphone (or microphone array) on the receiver 120.

The video device 100 may offer additional functionality, such as when a call is not in progress. For example, the video device 100 may allow the user and/or administrator to install a "picture frame" app to cycle through images uploaded to the video device 100, or a video streaming app such as YouTube, Netflix, Amazon Prime, Hulu, or the like.

Figure 3:
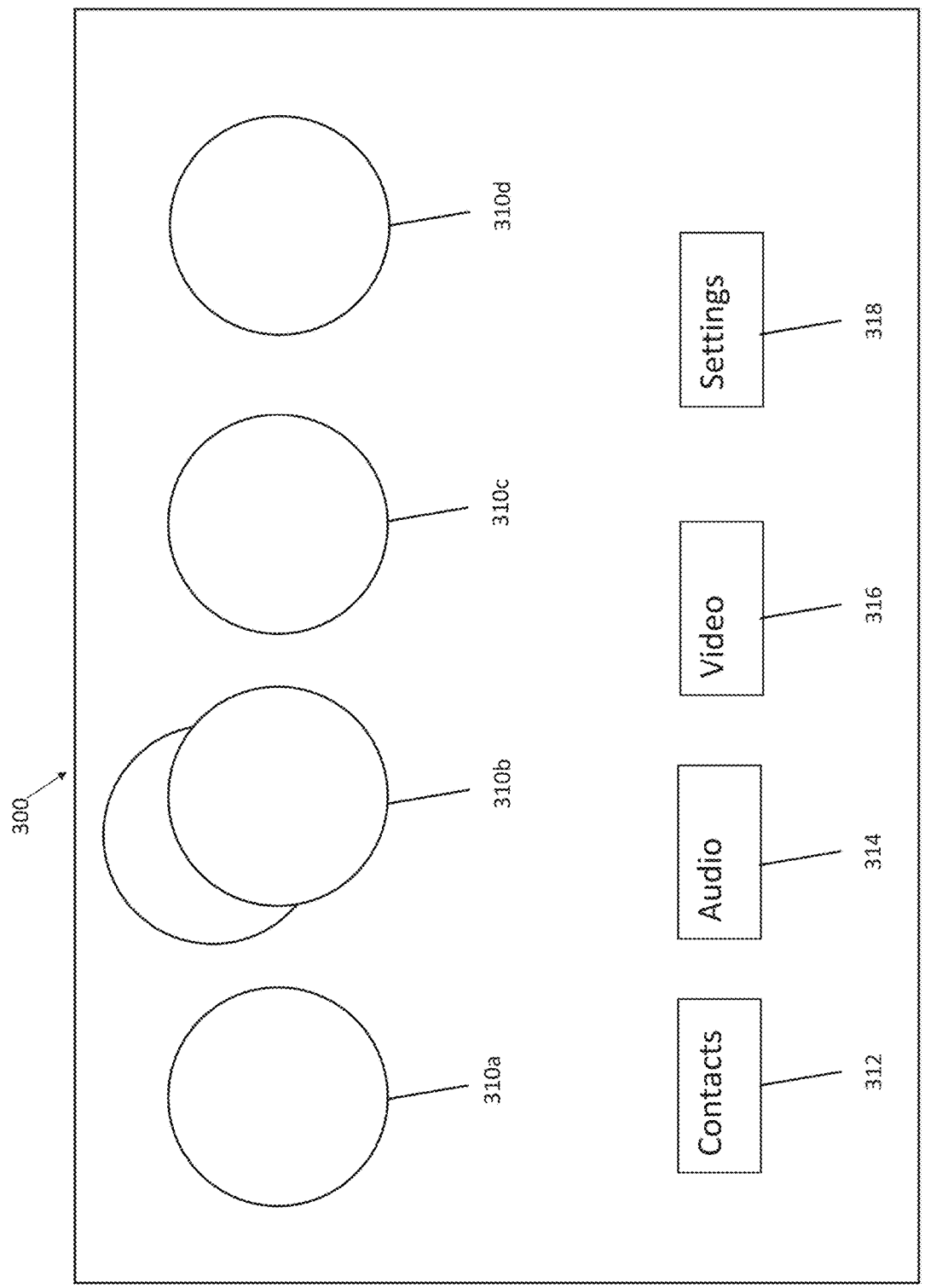
FIG. 3 is a first user interface according to an embodiment.

FIG. 3 shows a representative user interface 300 of the type displayed on display 114. The user interface 300 may be displayed during a standby mode of the video device 100, when no call is in progress or other activity is ongoing. The user interface 300 includes a number of icons 310*a-d*, each representing an individual or group contact. For example, icon 310*a, c*, and *d* may each be selected by the user touching the display 114 to initiate a call to a corresponding individual contact. Aggregate Icon 310*b* may be selected to initiate a group call to a group of contacts, each represented by an individual icon within the aggregate icon 310*b*. In some embodiments, hovering over the aggregate icon 310*b* may cause it to switch to an exploded view, allowing the user to place a call to an individual within the group.

The user interface 300 may also provide a number of other input elements. For example, a contacts button 312 may allow a user to view a list of contacts, arranged alphabetically or otherwise; an audio button 314 and video button 316 may allow the user to toggle between calling contacts using audio only, or audio and video, respectively; and a settings button 318 may allow the user to access a menu to change or more settings of the video device 100 as discussed herein.

Figure 4:
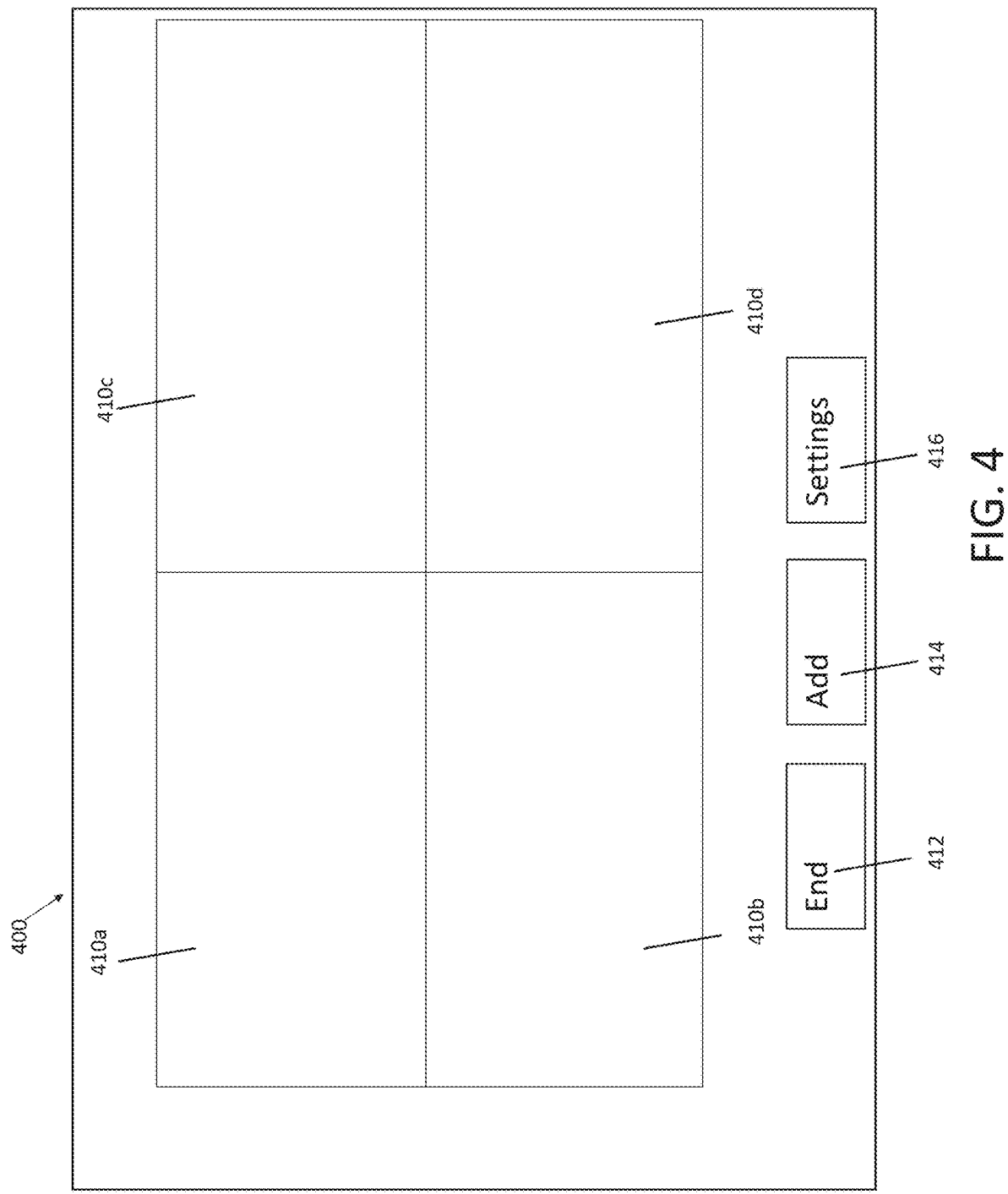
FIG. 4 is a second user interface according to an embodiment.

FIG. 4 shows a user interface 400 displayed while a call is in progress on the video device 100. Each participant's video stream is shown in a respective region 410*a-d* of the user interface 400, and the participants' audio is played over the speaker. Where a participant is not participating in the call by video, a placeholder icon or preset image of the participant may be displayed in the participant's respective region instead. The user interface 400 may provide additional functionality, such as an end button 412 for ending a call in progress; an add button 414 for adding additional participants to the call; and a settings button 416 to allow the user to access a menu to change or more settings of the video device 100 as discussed herein.

Processes and methods associated with various embodiments, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. According to one embodiment, the computer-readable medium may be non-transitory in that the computer-executable instructions may be stored permanently or semi-permanently on the medium. Such signals may define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Python, Javascript, Visual Basic, C, C#, or C++, etc., or any of a variety of combinations thereof. The computer-readable medium on which such instructions are stored may reside on one or more of the components of a general-purpose computer described above, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

The computer system may include specially-programmed, special-purpose hardware, for example, an application-specific integrated circuit (ASIC) or a field programmable gate array (FPGA). Aspects of the invention may be implemented in software, hardware or firmware, or any combination thereof. Further, such methods, acts, systems, system elements and components thereof may be implemented as part of the computer system described above or as an independent component.

A computer system may be a general-purpose computer system that is programmable using a high-level computer programming language. A computer system may be also implemented using specially programmed, special purpose hardware. In a computer system there may be a processor that is typically a commercially available processor such as the Pentium class processor available from the Intel Corporation. Many other processors are available. Such a processor usually executes an operating system which may be, for example, any version of the Windows, iOS, Mac OS, or Android OS operating systems, or UNIX/LINUX available from various sources. Many other operating systems may be used. The RETM implementation may also rely on a commercially available embedded device, such as an Arduino or Raspberry Pi device.

Some aspects may be implemented as distributed application components that may be executed on a number of different types of systems coupled over a computer network. Some components may be located and executed on mobile devices, servers, tablets, or other system types. Other components of a distributed system may also be used, such as databases or other component types.

The processor and operating system together define a computer platform for which application programs in high-level programming languages are written. It should be understood that the invention is not limited to a particular computer system platform, processor, operating system, computational set of algorithms, code, or network. Further, it should be appreciated that multiple computer platform types may be used in a distributed computer system that implement various aspects of the present invention. Also, it should be apparent to those skilled in the art that the present invention is not limited to a specific programming language, computational set of algorithms, code or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP). Certain aspects of the present invention may also be implemented on a cloud-based computer system (e.g., the EC2 cloud-based computing platform provided by Amazon.com), a distributed computer network including clients and servers, or any combination of systems.

It should be appreciated that the invention is not limited to executing on any particular system or group of systems. Also, it should be appreciated that the invention is not limited to any particular distributed architecture, network, or communication protocol.

Further, on each of the one or more computer systems that include one or more components of the device, each of the components may reside in one or more locations on the system. For example, different portions of the components of the device may reside in different areas of memory (e.g., RAM, ROM, disk, etc.) on one or more computer systems. Each of such one or more computer systems may include, among other components, a plurality of known components such as one or more processors, a memory system, a disk storage system, one or more network interfaces, and one or more busses or other internal communication links interconnecting the various components.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A video device comprising:
   a base unit;
   a network interface;
   a handheld receiver communicatively coupled to the base unit;
   a graphical user interface (GUI) positioned on the base unit, the GUI being configured to sense a touch of a user; and
   at least one processor housed in the base unit, the at least one processor configured to:
      initiate, over the network interface, a call with at least one other participant responsive to a single touch by the user on a region of the GUI;
      display, on the GUI, at least one first video stream from the at least one other participant; and
      stream, to the handheld receiver, an audio component of the at least one first video stream from the at least one other participant;
      wherein the base unit further comprises a sensor configured to detect a presence of the handheld receiver on a cradle of the base unit, and wherein the at least one processor is further configured to:
         responsive to detecting a presence of the handheld receiver on the cradle of the base unit, switch to a changed mode of operation of the video device.

2. The video device of claim 1, wherein the at least one processor is further configured to receive, over the network interface, an instruction to change at least one operating parameter of the video device.

3. The video device of claim 2, wherein the instruction is received from an administrator of the video device.

4. The video device of claim 2, wherein the at least one operating parameter is at least one of a speed-dial contact, an image of a contact, contact information for the contact, an operational mode of the video device, and a default operation of at least one video camera or at least one microphone of the video device.

5. The video device of claim 1, further comprising at least one video camera, wherein the processor is configured to transmit, over the network interface, at least one second video stream to the at least one other participant.

6. The video device of claim 1, wherein the at least one processor is further configured to modify the at least one first video stream on the display.

7. The video device of claim 6, wherein the modification comprises at least one of a cropping and a zooming of the at least one first video stream.

8. The video device of claim 1, wherein the handheld receiver further comprises a second display configured to display the at least one first video stream from the at least one other participant.

9. A video device comprising:
 a base unit;
 a network interface;
 a handheld receiver communicatively coupled to the base unit;
 a graphical user interface (GUI) positioned on the base unit, the GUI being configured to sense a touch of a user; and
 at least one processor housed in the base unit, the at least one processor configured to:
  initiate, over the network interface, a call with at least one other participant responsive to a single touch by the user on a region of the GUI;
  display, on the GUI, at least one first video stream from the at least one other participant; and
  stream, to the handheld receiver, an audio component of the at least one first video stream from the at least one other participant;
 wherein the handheld receiver further comprises a second display configured to display the at least one first video stream from the at least one other participant.

10. The video device of claim 9, wherein the at least one processor is further configured to receive, over the network interface, an instruction to change at least one operating parameter of the video device.

11. The video device of claim 10, wherein the instruction is received from an administrator of the video device.

12. The video device of claim 10, wherein the at least one operating parameter is at least one of a speed-dial contact, an image of a contact, contact information for the contact, an operational mode of the video device, and a default operation of at least one video camera or at least one microphone of the video device.

13. The video device of claim 9, further comprising at least one video camera, wherein the processor is configured to transmit, over the network interface, at least one second video stream to the at least one other participant.

14. The video device of claim 9, wherein the at least one processor is further configured to modify the at least one first video stream on the display.

15. The video device of claim 14, wherein the modification comprises at least one of a cropping and a zooming of the at least one first video stream.

16. The video device of claim 9, wherein the base unit further comprises a sensor configured to detect a presence of the handheld receiver on a cradle of the base unit, and wherein the at least one processor is further configured to:
 responsive to detecting a presence of the handheld receiver on the cradle of the base unit, switching to a changed mode of operation of the video device.

* * * * *